United States Patent [19]

Didwania et al.

[11] Patent Number: 4,735,682

[45] Date of Patent: Apr. 5, 1988

[54] METHOD FOR RECOVERY OF CELLULOSIC FIBERS CONTAINING LATEX SOLIDS FROM LATEX BONDED BROKE

[75] Inventors: Hanuman P. Didwania, Lisle, Ill.; Robert J. Eber, Appleton, Wis.

[73] Assignee: James River-Norwalk, Inc., Norwalk, Conn.

[21] Appl. No.: 918,841

[22] Filed: Oct. 14, 1986

Related U.S. Application Data

[63] Continuation of Ser. No. 703,700, Feb. 21, 1985, abandoned.

[51] Int. Cl.$^4$ .................. D21C 5/02; D21B 1/32
[52] U.S. Cl. ................................ 162/8; 162/191
[58] Field of Search .................. 162/5, 4, 8, 60, 191

[56] References Cited

U.S. PATENT DOCUMENTS

| | | | |
|---|---|---|---|
| 2,488,515 | 11/1949 | Sherman et al. | 162/191 |
| 3,047,452 | 7/1962 | De Vos | 162/5 |
| 3,245,868 | 4/1966 | Espenmiller et al. | 162/8 |
| 3,262,838 | 7/1966 | Vieth et al. | 162/8 |
| 3,425,897 | 2/1969 | Murphy, Jr. | 162/8 |
| 3,766,001 | 10/1973 | Gleason et al. | 162/8 |
| 4,017,033 | 4/1977 | Tra | 162/8 |
| 4,146,727 | 11/1983 | Elton et al. | 162/191 |
| 4,162,186 | 7/1979 | Wood et al. | 162/8 |
| 4,420,368 | 12/1983 | Drach | 162/8 |

FOREIGN PATENT DOCUMENTS

450011 11/1974 U.S.S.R. .................. 162/147

OTHER PUBLICATIONS

Matcke, "Repulping of Printed Waste Paper by Flotation of Printing Ink (Deinking)," 1971.

Primary Examiner—S. Leon Bashore
Assistant Examiner—K. M. Hastings
Attorney, Agent, or Firm—William A. Aguele; Harry W. Hargis, III; Thomas H. Whaley

[57] ABSTRACT

Cellulosic fibers containing latex solids are recovered from latex bonded broke by agitation of the broke in an aqueous alkaline solution having an alkali metal hydroxide concentration of 0.5 to 1.5 mol percent for a period of time in the range of ten minutes to four hours. The resulting fibers containing cured latex solids may be added to conventional papermaking fibers in amounts as high as 10 to 15 percent by weight for the production of facial quality tissue to produce a high quality product web.

1 Claim, 1 Drawing Sheet

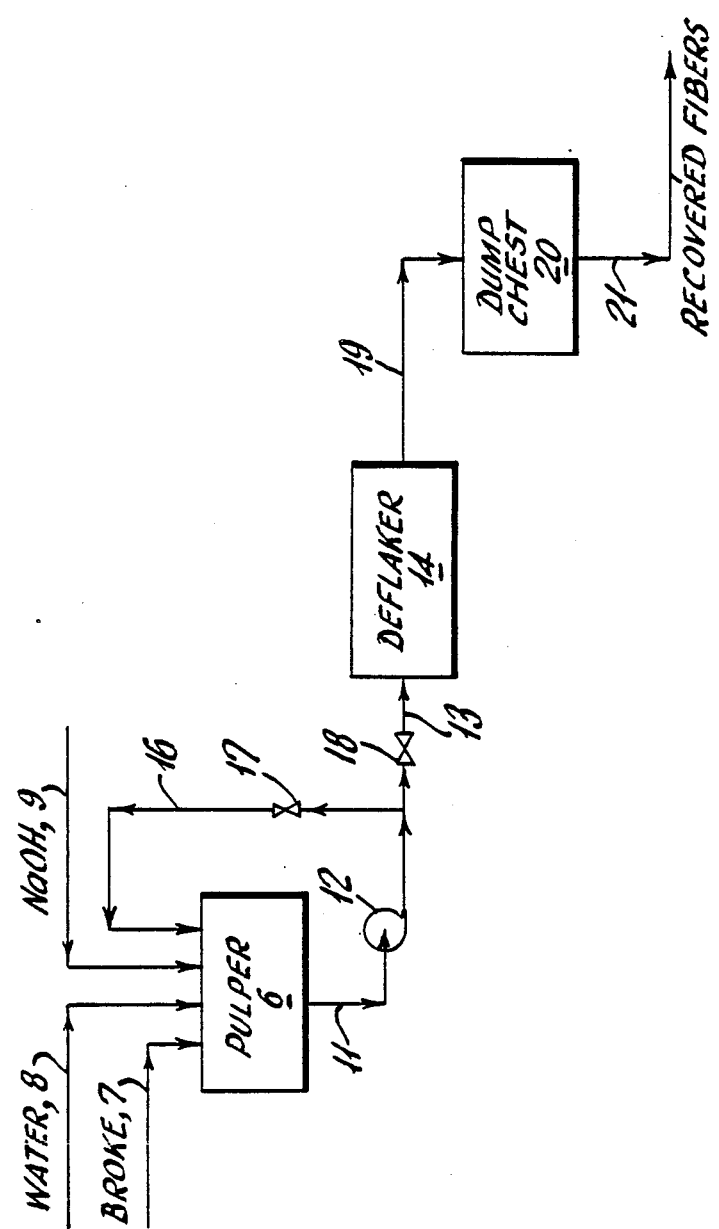

METHOD FOR RECOVERY OF CELLULOSIC FIBERS CONTAINING LATEX SOLIDS FROM LATEX BONDED BROKE

This is a continuation of application Ser. No. 703,700, filed Feb. 21, 1985, now abandoned.

This invention relates to a process for the recovery of paper-making fibers from latex bonded broke or paper containing latex.

In the manufacture of paper it is desirable to reuse, with a minimum of loss, the waste paper or broke which results during the normal course of production. The disintegration of paper broke to a fibrous state is usually accomplished by repulping in water by mechanical agitation, optionally in combination with chemical treatment. The resulting pulp suspension is returned to the papermaking cycle without further processing. Repulping conditions are preferably of such a nature that the papermaking fibers in the broke will be separated from one another and from the various nonfibrous constituents of the paper with a minimum amount of mechanical or chemical damage to the fibers. Repulping has worked well in the case of broke containing rosin size, clay, ink and ink binders, as well as for wet strength broke containing thermosetting wet-strength resins, such as cationic amine-modified urea-formaldehyde resins, melamineformaldehyde resins, cationic resins prepared by reacting epichlorohydrin with a polyamide of a saturated dicarboxylic acid and a polyalkylene polyamine, and cationic resins prepared by reacting epichlorohydrin with a polyalkylene polyamine. However, a repulping problem does arise in the production of certain coated papers used for high quality offset printing where the paper is coated with a substantially water resistant coating, such as latex.

Conventional methods for repulping latex bonded broke have not been satisfactory. Cured latex solids, which result from the use of latex for bonding air laid webs, is difficult to separate from the cellulosic fibers. Although separation may be effected by chemical treatment or mechanical action, if excessive mechanical action is employed, the energy input and loss of usable fibers may be prohibitive; if excessive chemical treatment is employed, the latex will separate from the fibers but must be removed from the repulping system to avoid subsequent problems during use of the recovered fibers in papermaking. In addition, excessive chemical treatment tends to leave the latex tacky and hard to handle, further compounding its disposal problem.

The prior art in this area describes various methods for repulping broke by freeing the individual paper fibers from the non-fibrous bonding materials, which are then separated from the fibers. U.S. Pat. No. 3,245,868 to Espenmiller et al., discloses a process for recovering papermaking fibers from paper broke which has been treated by a wet strength thermosetting resin by treating the broke with acid for a period of time sufficient to hydrolyze the resin followed by washing the fibers free of resin. U.S. Pat. No. 3,425,897 to Murphy, describes a defibering process where the waste wet strength paper is cooked at elevated temperatures and pressure under alkaline conditions. After the initial defibering there is further treatment under milder conditions with simultaneous mechanical agitation. U.S. Pat. No. 3,047,452 to De Vos, describes a process for disintegration of paper broke, having a protein-bonded coating insolubilized by formaldehyde, and containing latex wherein the hardened protein binder is hydrolyzed in the presence of proteolytic enzymes. Finally, U.S. Pat. No. 3,766,001 to Gleason, et al., describes a process for the recovery of pulp from waste paper containing various types of inks, resins, and resinous or hot melt type adhesives by cooking the paper in an aqueous solution containing sodium hydroxide, sodium carbonate, sodium or ammonium bicarbonate and sodium borate followed by water washing of the recovered fibers.

The present invention provides a method for treating latex bonded broke or paper containing latex for recovery of the fibers for reuse in papermaking in which latex solids remain on the individual papermaking fibers which are separated from one another in a repulping operation making them suitable for reuse in the papermaking process without the necessity for removal of the latex solids or disposal of environmentally detrimental wastes.

Briefly the process of repulping latex bonded broke comprises simultaneously subjecting the latex bonded broke to initial fiberization by mechanical agitation in the presence of an aqueous alkaline solution, e.g., caustic soda solution, followed by substantially complete defiberization in a conventional deflaking operation.

The process is illustrated in the accompanying drawing which is a diagrammatic flow sheet showing the basic steps in the process.

Shredded latex bonded broke is added to pulper 6 through line 7 together with sufficient water from line 8 and sodium hydroxide from line 9 to provide a pulp containing about 6 weight percent broke, based on the dry weight of the broke, and an aqueous alkaline solution having a sodium hydroxide concentration in the range of 0.5 to 5 mol percent. The pulper is of conventional design, such as that described in U.S. Pat. No. 3,073,535.

Latex bonded papers which may be processed by the method of this invention include those wherein the latex solids are ethylene vinyl acetate copolymers, copolymers of acrylic esters and vinyl acetate, and ethylene polyvinyl chlorides. The mechanical action of the pulper in the presence of an aqueous alkaline solution containing 0.5 mol percent or more caustic results in up to 60 to 70 defiberization of the broke in the pulper.

The pulp from pulper 6 containing partially separated fibers, with the latex still adhering to the fibers, is removed from the pulper 6 through line 11 by pump 12 and after washing with water (not illustrated) introduced through line 13 to deflaker 14 wherein substantially complete defiberization takes place. As illustrated, pulp from pump 12 may be recirculated to pulper 6 through line 16 as controlled by valve 17, or passed to deflaker 14 at a rate controlled by valve 18. The deflaker 14 may be any various types commercially available, including parallel disc, conical, concentric or matted type deflakers, well known in the art. The action of the deflaker 14 causes the fibers to separate from one another but does not cause the latex to separate free from the fibers. The fibers with latex solids still attached thereto are discharged from flaker 14 through line 19 to a dump chest 20 and drawn off through line 21 for use in making up fiber finish for wet laid web formation. Unexpectedly, the latex solids content of the recovered fibers is not detrimental to their usefulness in conventional wet laid web forming processes wherein they may be blended with papermaking fibers free from latex solids to produce toilet tissue and towels In the following examples, which illustrate the process of this invention, the broke employed was that from a commercial air laid product in which ethylene vinyl acetate latex is used as a binder during formation of the web and subsequently cured by drying.

A number of test runs were carried out in a Beloit Jones pilot plant to determine whether broke from paper toweling manufactured by air laying wood cellulose fibers bonded on both sides with an ethylene vinyl acetate copolymer latex at an add on level of 23.8 weight percent with an 80 percent or higher cure. The results of these tests are reported in the following examples.

EXAMPLE 1

Latex bonded broke was dispersed in water to form a pulp containing 6 weight percent broke (dry basis) with sodium hydroxide of 1.5 mol percent, and subjected to repulping in a Beloit Jones repulper. After 45 minutes repulping with 55 horsepower-day/ton (HPD/T) energy input the resulting pulp was removed and screened. Approximately 20 weight percent of the broke was fiberized.

EXAMPLE 2

The test was repeated by repulping broke at the same pulp and alkali concentrations as in Example 1 in the pulper for ten minutes and then processed in a deflaker at 37 HPD/T for five minutes. The same amount of total energy input (55 HPD/T) resulted in reduction in the percentage undefibered broke to about 10%.

The effluent and pulp samples from the broke subjected to the pulper and deflaker treatments were examined for latex solids using the Measurex Analyzer. Results (Table 1) show that on a relative basis there appears to be a directional increase in the latex solids content in rejected knits and in fines. Overall, the latex solids content in screened pulp is not significantly changed. This indicates that the latex solids are not significantly separated from the fibers. Electron microscopic examination showed that after pulper/deflaker treatments, the broke fibers, even though not interbonded with latex solids were still coated with the latex solids. The processed broke pulp sheets were found to have fiber crossings with sharp edges, and were essentially free from particles or clumps of fibers.

TABLE 1

| Latex Solids on Processed Broke Pulp | |
|---|---|
| | Latex Solids Weights % |
| Non-processed Broke | 22.4 |
| Processed Broke Pulp | |
| Washed Pulp | 20.1 |
| Washed Pulp Classified on .006" screen: | |
| Acceptable | 18.8 |
| Reject Knits | 23.6 |
| Fines (100 mesh) | 25.4 |

EXAMPLE 3

In another set of test runs, samples of the latex bonded broke of Example 1 were repulped at 0.5 mol% NaOH concentration and at 1.5 mol% NaOH concentration. At 40 HPD/T energy input, the percentage yield, of acceptable repulped broke fibers that passed through 0.006 inch cut and were retained on 100 mesh, was 45 weight percent at 0.5 mol % NaOH concentration and 65 weight percent at 1.5 mol % NaOH.

EXAMPLE 4

Latex bonded broke from the same source as in Example 1 with 1.5 mol % NaOH concentration were repulped at 18 HPD/T energy input and then 12 HPD/T additional energy input was made in a deflaker. A yield of 75% was achieved. Yield was not increased on additional input of energy in the deflaker. When the same test run was made with 0.5 mol % NaOH concentration, a 75% yield was reached at 35 HPD/T total energy input.

EXAMPLE 5

Defibered and repulped broke containing latex solids prepared according to Example 2 was added at 10% and 15% levels dry weight to a good quality furnish consisting of 50/50 Northern softwood and hardwood species. Laboratory handsheets which were uncompacted and creped to simulate commercial tissue sheets were made up from the original furnish and from the modified furnish formulations. It was found that with good quality furnish tensile values of the handsheets were increased, bulk was somewhat decreased and softness was decreased; the observed effects are more pronounced at 15% addition than at 10% addition.

EXAMPLE 6

Defibered and repulped broke containing latex solids prepared according to Example 2 was added to 100% secondary fiber furnish and handsheets made up as in Example 5. The presence of repulped broke improved the quality of the appearance of the handsheets, while the bulk, tensile strengths and hand softness were not changed significantly.

The foregoing examples demonstrate that latex bonded broke may be treated with relatively low concentrations of sodium hydroxide effecting defiberization without separation of latex from the fibers and that the resulting defiberized and repulped broke may be added to conventional cellulosic papermaking fibers and wet laid to form a high quality web.

We claim:

1. A process for the recovery of wood cellulose fibers coated with cured latex solids from air laid latex bonded paper broke wherein the latex is selected from the group consisting of latices of ethylene vinyl acetate copolymers, copolymers of acrylic esters and vinyl acetate, and ethylene polyvinyl chlorides which consists essentially of:

(a) repulping the broke by agitation in an aqueous alkaline solution having alkali metal hydroxide concentration in the range of 0.5 to 1.5 mol percent without substantial separation of the cured latex solids, (b) subjecting the pulp comprising broke fibers and associated latex solids from step (a) to deflaking for a period of time sufficient to substantially complete defiberization of cellulose fibers without substantial separation of the cured latex solids therefrom and without substantial degradation of the fibers, (c) recovering cellulose fibers from the broke as individualized fibers containing a major portion of the cured latex solids from step (b), (d) dispersing fibers containing the cured latex solids as recovered in step (c) in admixture with other cellulosic papermaking fibers in an aqueous dispersion to form a papermaking fiber furnish, and (e) forming a fibrous tissue web from the fiber furnish prepared in step (d).

* * * * *